United States Patent [19]

Koncelik

[11] Patent Number: 6,024,908
[45] Date of Patent: Feb. 15, 2000

[54] METHOD OF MOLDING A THERMOSTAT POLYMER DOOR SKIN, SHELF STABLE THERMOSTAT MOLDING COMPOSITION, AND DOOR ASSEMBLY USING THE DOOR SKINS SO FORMED

[76] Inventor: Kenneth J. Koncelik, 4500 Woodlawn Dr., Mason, Ohio 45040

[21] Appl. No.: 08/943,388

[22] Filed: Oct. 3, 1997

[51] Int. Cl.[7] ...................................................... C08J 5/00
[52] U.S. Cl. ................................ 264/331.11; 264/331.12; 264/331.18; 264/331.19; 264/331.21
[58] Field of Search ................................ 52/309.9, 455, 52/456, 784.1; 524/425; 264/45.1, 45.3, 45.5, 45.6, 46.4, 46.6, 331.11, 331.12, 331.18, 331.19, 331.21

[56] References Cited

U.S. PATENT DOCUMENTS

| | | | |
|---|---|---|---|
| 4,922,674 | 5/1990 | Thorn | 52/309.15 |
| 4,965,030 | 10/1990 | Thorn | 264/46.5 |
| 5,074,087 | 12/1991 | Green | 52/309.9 |
| 5,445,208 | 8/1995 | Shaner et al. | 160/232 |
| 5,537,789 | 7/1996 | Minke et al. | 52/313 |
| 5,644,870 | 7/1997 | Chen | 49/501 |
| 5,837,172 | 11/1998 | Pritchard et al. | 264/46.4 |

*Primary Examiner*—Robert Dawson
*Assistant Examiner*—D. Aylward
*Attorney, Agent, or Firm*—Wood, Herron & Evans, L.L.P.

[57] ABSTRACT

A method of forming polymer door skins using a low viscosity, shelf stable homogeneous thermosetting reinforced polymer material. The polymer material includes a thermosetting curable polymer, a particulate filler, mica platelets, staple fibers, and hollow microspheres. The reinforced resin door skins of the present invention are formed at relatively low pressures which decreases costs by allowing the use of aluminum rather than steel tooling. The door skins, when assembled on a frame with an insulative core provides a molded, reinforced plastic door having a superior wood grain surface appearance, superior thermal characteristics and lower manufacturing costs.

15 Claims, 2 Drawing Sheets

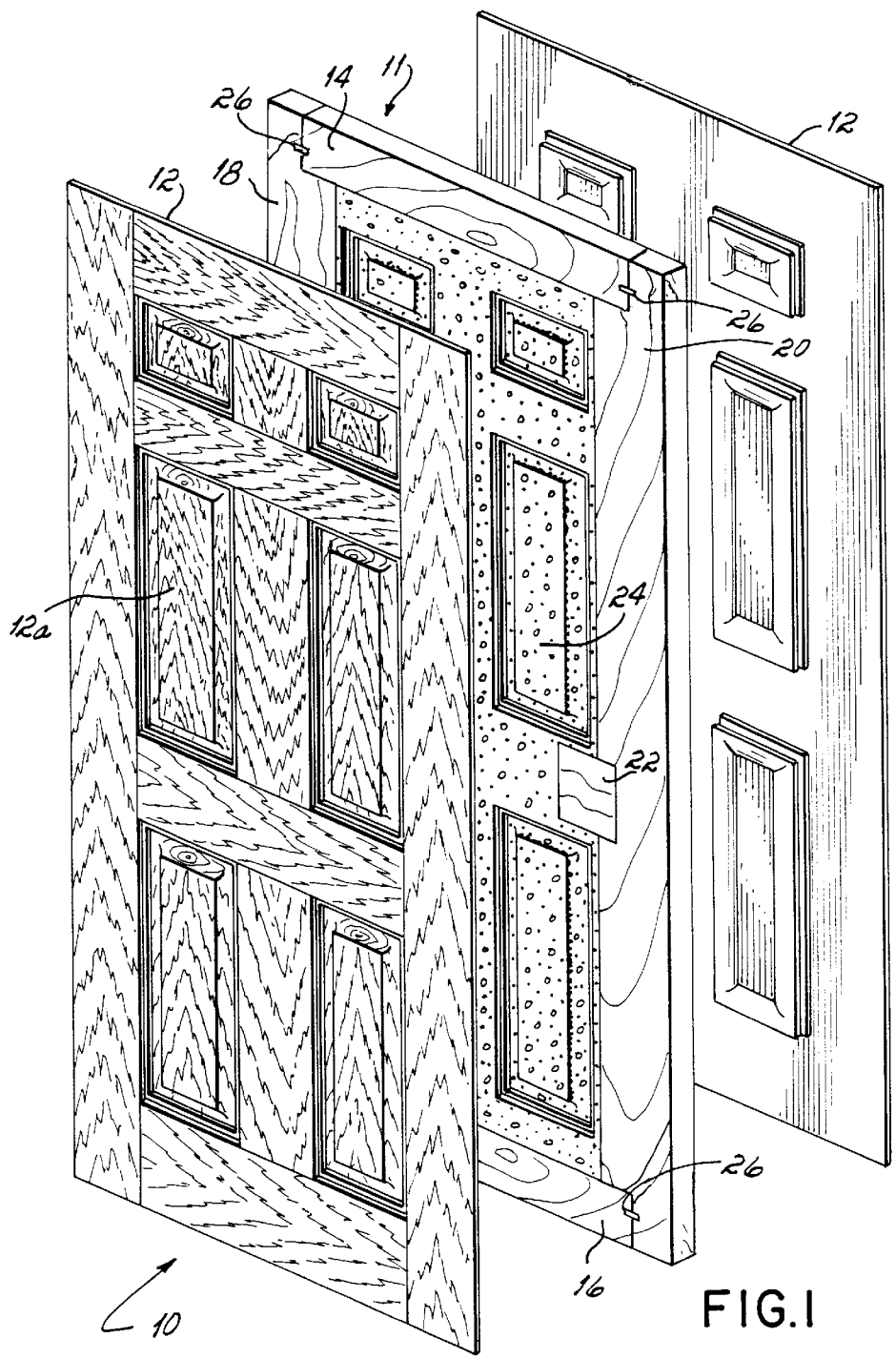
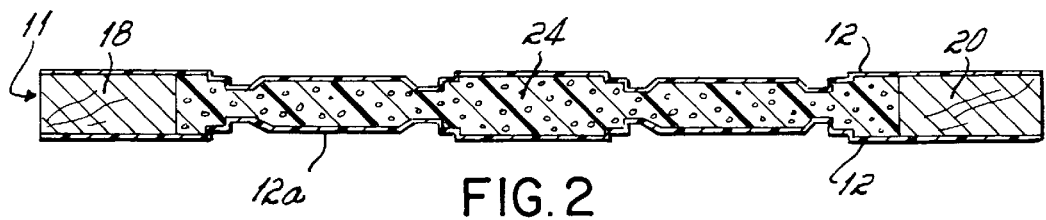

METHOD OF MOLDING A THERMOSTAT POLYMER DOOR SKIN, SHELF STABLE THERMOSTAT MOLDING COMPOSITION, AND DOOR ASSEMBLY USING THE DOOR SKINS SO FORMED

BACKGROUND OF THE INVENTION

Door assemblies having outer panels or skins formed of a fiber reinforced plastic are well known. Such door assemblies typically include a wood frame and an insulative core sandwiched between the outer skins. Further, the skins are typically molded with the outer surface having a wood grain appearance such that the skins can be stained to simulate the appearance of a solid wood door. A number of patents disclose door assembles using reinforced polymer door skins, including U.S. Pat. Nos. 3,950,894; 4,550,540; 4,864,789; 4,720,951; 4,850,168; 4,860,512; 4,901,493; 4,922,674; and 5,142,835.

A number of companies, including the assignee of the present invention, offer commercially a fiber reinforced thermoset plastic door in which the skins are formed by compression molding a sheet molding compound (SMC). SMC typically includes a molding resin of unsaturated polyester polymer blended with a vinyl monomer such as styrene. The SMC includes on the order of 20 to 25 percent by weight glass fiber reinforcement and 10 to 40 percent by weight of inert filler material, typically calcium carbonate. The molded door skins have a relatively large surface area, approximately 18 square feet but are relatively thin on the order of 0.070 inch to 0.120 inch.

The SMC is formed by blending resin and filler to form a resin paste. The resin paste is deposited on a moving plastic carrier film passing directly beneath. Simultaneously, glass fiber rovings are fed into a rotary chopper above the resin coated carrier film. The fibers are cut to length, e.g., 1 inch, and are randomly deposited on the underlying layer of resin. Downstream from the chopping operation, a second carrier film is coated with resin paste and is laid, resin side down, on top of the chopped fibers. This stage of the process creates a resin paste and glass fiber "sandwich" which is then sent to a series of compaction rollers where the glass fibers are wetted out with the resin paste, and excess trapped air is squeezed out of the sheet. At the end of the compaction rollers, the SMC sheet is taken up on a storage roll or bi-folded into a bin. In this stored condition, the roll or folded sheet is wrapped with a barrier film to avoid styrene evaporation.

The SMC resin paste has a viscosity of about 20,000 to 40,000 centipoise when it is deposited on the carrier film. Before the SMC can be used for molding, however, it must age or mature. This maturation time is required to allow the relatively low viscosity resin to chemically thicken. Typically, SMC requires approximately 3 to 5 days to reach the desired molding viscosity. During this time, the viscosity of the material increases such that the material may be cut to the desired length and physically handled by the mold operators. At this point, the SMC sheet reaches about 20 to 30 million centipoise, a consistency similar to leather. SMC continues to thicken after the molding viscosity is reached and therefore has a limited shelf life. Usually SMC must be used within 10 to 14 days from the date of manufacture. If the SMC is not used within this time, its viscosity increases to a point where it can no longer be molded. At this point, the SMC is unusable and becomes waste that must be disposed of.

When the SMC is ready for compression molding, the material is spread onto a cutting table and cut into pieces of predetermined size and shape. The cutting operation is usually done manually with a template and a mat knife by the press operator. The cut pieces are stacked and assembled into a charge pattern that has been determined to be the optimum shape and volume to fill the mold cavity. It is important to assemble the charge pattern as accurately and consistently as possible to avoid process variations.

Generally, the mold is a matched set of forged steel upper and lower die halves that have surfaces that have been formed to create the desired configuration in the molded skins. Typically, this configuration is a flush or paneled door with a wood grain on the outer surface. The steel dies are plated or surface treated to reduce wear, typically with a chrome flash on the surface to aid in release of the molded skins from the die. The mold is heated typically in the range of 300°F. to 350° F.

After charge placement in the mold, the mold is closed by lowering the upper die half, which is mounted to the ram of a large press, onto the lower die half. As the dies come together, the SMC material is compressed therebetween. Pressures for SMC molding of door skins typically exceed 1,000 psi and can go as high as 2,000 psi.

Under heat and pressure, the SMC is transformed from its leather-like quality to a flowable compound. The SMC flows to fill out the mold cavity. Typically, a vacuum is extracted from the mold cavity to aid in flow. During the molding operation, the heat and pressure activate a catalyst in the SMC that causes curing of the thermoset material. The cure time of the SMC and mold varies from 30 to 150 seconds depending on part thickness and material formulation.

After curing, the mold is opened and the door skin is ejected from the lower mold surface with the use of integral ejector pins. The hot skins are handled carefully and usually placed on support racks to cool to ambient temperature. Any edge flash from the part is removed at this time. After the door skin has cooled, it has exceedingly good tensile and flexural strength. The skins are then stacked for shipment.

Compression molding of SMC has a number of disadvantages. One of the major disadvantages is the cost of the dies. Because the pressures involved in the molding operation of door skins typically are in the range of 1,000 to 2,000 psi, the dies must be formed of forged tool steel to withstand these pressures. The weight of the dies for molding of door skins is on the order of 40,000 pounds. The tooling costs are also quite significant. The high pressures involved in SMC compression molding of door skins also require large presses, typically on the order of 2,000 tons. The required presses and forged steel dies thus involve significant size, weight, and cost.

Another disadvantage of SMC, as mentioned above, is that the SMC after being blended and processed with the chopped glass fibers must be set aside to allow for curing of the compound to a viscosity at which it can be handled by the mold operator. This typically requires storage of the material from 5 to 10 days before use. However, if the material is not used, the viscosity continues to increase and the SMC can "overcure". Typically, the SMC must be used within 10 days after it first reaches its desired viscosity. When the material overcures, viscosity rises to a level at which the material may no longer be suitably molded. The SMC at this point is worthless and must be discarded.

A further disadvantage of SMC is that the composition must contain a relatively large amount of a release agent typically zinc stearate to aid in the release of the skins from the dies. Zinc stearate is typically added to the SMC in the range of 5 to 6 percent by weight. However, the zinc stearate as it is intended to do accumulates on the surface of the door skin. The presence of zinc stearate on the outer surface of the door skin detracts from the ability to stain the door. Further, the inner surface of the door is adhesively secured to the door frame. The presence of zinc stearate on the inner surface interferes with this adhesive bond.

Finally, because of the viscosity of the SMC in the mold, it is difficult or impossible to mold the part with openings, e.g., for windows, because the material will not flow around the opening. Typically, when door skins with openings are compression molded, knit lines form where the material flows back together. These knit lines form an area of weakness along which the door may fail. Accordingly, when it is desired to have a door having openings for glass, the cured skins must be cut to form the opening resulting in material waste and additional disposal problems.

SUMMARY OF THE INVENTION

This invention overcomes the problems of SMC compression molding by providing a polymer door skin with superior thermal characteristics, improved graining appearance and, importantly, significantly lower manufacturing costs. The present invention provides molded door skins formed of a low viscosity molding compound (LVMC). The LVMC has a significantly lower viscosity than SMC. As a result, it can be formed into door skins or other high aspect ratio parts at relatively low pressures and using tooling which is of significantly less weight and cost than that used in compression molding of SMC. That is, the LVMC can readily fill out the mold and achieve a superior wood grain pattern with lower pressures and consequently less expensive tooling and smaller presses than required for molding SMC.

The LVMC of the present invention comprises a low viscosity, shelf stable homogeneous thermosetting polymer molding composition which includes a thermosetting curable polymer, a particulate filler, mica platelets, staple fibers, and hollow microspheres in a minor amount to facilitate the wetting-out of the polymer in the homogeneous composition.

A presently preferred LVMC composition includes about 25 to about 80 wt % thermosetting curable polymer, about 5 to 40 wt % calcium carbonate, about 5 to about 15 wt % mica, up to about 3 wt % hollow microspheres, about 0.5 to about 10 wt % staple fibers, and an effective amount of a catalyst and mold release agent.

The method of the present invention includes the steps of admixing a curable thermosetting polymer, a catalyst, a particulate filler and staple fibers to form a homogeneous composition having shelf stability, introducing the homogeneous composition into a mold having a cavity for a door skin, and molding the homogeneous composition in the mold cavity to cure the thermosetting polymer and form the thermoset polymer door skin.

The LVMC of the present invention has a significantly lower viscosity than SMC and a similar molding material known as bulk molding compound (BMC). Because of the lower viscosity of LVMC, a significantly lower pressure is required to mold the skins, which allows for the use of aluminum tooling rather than forged tool steel, thereby greatly decreasing tooling cost. For example, 1,500 to 2,000 pound aluminum tooling may be used for molding LVMC into door skins as opposed to 40,000 pound steel tooling for molding SMC. Further, the aluminum tooling used with LVMC provides on the order of a ten-fold decrease in the cost of the tooling. The LVMC is molded at pressures up to about 500 psi, preferably in the range of approximately 50–350 PSI and preferably about 210 PSI. These pressures are significantly below the more than 1,000 to 2,000 PSI pressures employed in compression molding SMC door skins. As a result, significantly smaller presses on the order of 300 to 500 tons may be used as opposed to the 2,000 ton presses used in compression molding SMC door skins.

Further, with lower viscosity and at these low pressures, the LVMC can more readily fill out the mold allowing good wood grain pattern definition and the molding of openings in the door for windows and for sidelight assembly. Less mold release is used in comparison to molding of the SMC door skins. The decreased amount of mold release allows for improved definition of the wood graining in the door skin on staining and provides better adhesion of the door skin to the wood frame assembly. Since the door skin is formed at low pressure, the density at the surface of a LVMC skin is significantly lower than that of an SMC skin. The decreased density allows for an increased number of voids or pores which increases surface area to improve stainability and adhesive adhesion. Another benefit of the LVMC, the material of the present invention, is increased tool life. As stated, the surface of one die half is provided with a simulated wood grain configuration to in turn provide the molded door skin with a simulated wood grain surface that can be stained to have the appearance of a solid wood door. Graining of the tool may be done by etching the tool surface. However, the high pressures and the high viscosities in SMC compression molding door skins cause wear of this etched surface. Regraining of the tool is expensive and time consuming. The low pressure and relatively low viscosity of LVMC extends tool life and particularly grain life.

Finally, the LVMC may be used to mold door skins immediately after mixing of the ingredients. No pre-cure time is needed to bring the viscosity to a level where the material may be handled and molded, thus eliminating the waiting period that SMC requires in which to mature before it may be used. Further, LVMC, since it does not require pre-curing, eliminates the possibility of over curing the material before molding and thus eliminates the possibility of generating large amounts of waste material that must be disposed of.

BRIEF DESCRIPTION OF THE DRAWINGS

FIG. 1 is an exploded, isometric view of the door assembly utilizing the molded door skins of the present invention.

FIG. 2 is a cross-sectional view of a door assembly utilizing the molded door skins of the present invention.

DETAILED DESCRIPTION OF THE INVENTION

Figure 3:
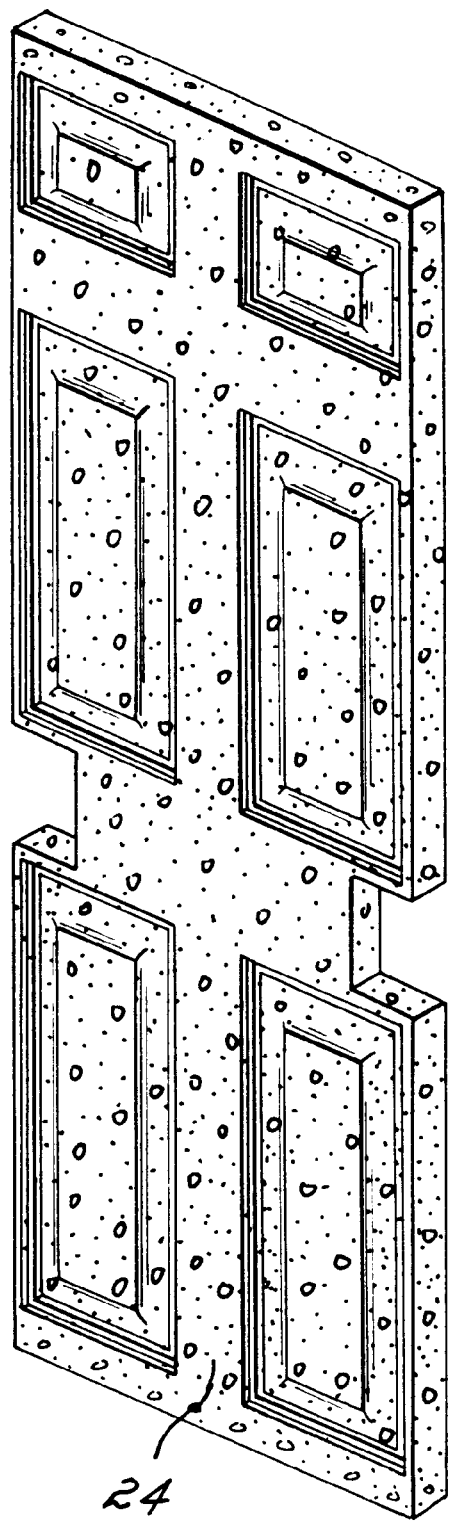
FIG. 3 is an isometric view of the insulative core of the door assembly shown in FIGS. 1 and 2.

Referring to FIG. 1, the door assembly 10 includes a pair of molded door skins 12, a wood frame 11, including upper and lower horizontal rails 14, 16 and vertical stiles 18, 20 interlocked with the rails 14, 16, and an insulative core 24 interior of the wood frame 11 and between the skins 12. The door skins 12 are molded by a method and composition described herein in detail and typically are about 0.080 to about 0.120 inches in thickness. The door skins 12 are molded to simulate the appearance of a solid wood entry door. In this regard, the skins may be molded with a flush surface or with panels, e.g., up to 10 panels to simulate the appearance of a paneled solid wood entry door. Six panels 12a are depicted in FIG. 1. Further, the outer surface of the skins are molded to simulate the appearance of a woodgrain (shown highly stylized in FIG. 1) This wood grained surface may be stained with an oil stain, for example, in any of the number of wood shades to simulate the appearance of a solid wood entry door.

With reference to the inner side of the door skins 12, the skins 12 are molded without any projections or surface features other than the relief due to the molding of the panels 12a. That is, other than the relief due to the molding of the panels 12a, the inner surface is substantially smooth without vertical or horizontal projections. This surface, however, may be molded to provide some roughness to the surface to aid in adhering of the skins to the frame 11 and to the insulative core 24.

Referring in addition to FIGS. 2 and 3, the core is pre-molded or pre-cast to a configuration to fit within the wood frame 11 and to mate with the configuration of the molded surface of the door such that the insulative core substantially fills the void between the skins 12 interiorly of the frame 11. The core is preferably formed of cast expanded polystyrene which provides good R-values and which maintains its R-value with time.

The LVMC composition used to form the skins 12 is a shelf stable homogeneous thermosetting, polymer composition. A presently preferred composition includes about 25 to about 80 wt % of the thermosetting curable polymer, about 5 to about 40 wt % calcium carbonate, about 5 to about 15 wt % mica, up to about 3 wt % hollow glass microspheres, about 0.5 to about 10 wt % staple fibers, and an effective amount of a catalyst and mold release agent. Suitable thermosetting polymers are polyester, polyurethane, polyvinyl and epoxy polymers and mixtures thereof. The catalyst is a suitable compound such as t-butyl perbenzoate (TBPB) and is added in an amount of about 0.25% of the liquid volume. The staple fibers may be carbon fibers or fiberglass. The use of carbon fibers provides the door with good thermal properties in that they decrease the linear coefficient of expansion of the door skin and have the added advantage of increasing tool life since carbon fibers are less abrasive than fiberglass on the wood-grained surface of the mold. The mica lends thermal stability to the finished door skin. Calcium carbonate is a preferred filler material, however, other fillers such as slate chips, wood flour, fly ash, barium sulfate, metal flakes, metal powders and other inert materials may be used. The hollow microspheres act as a dispersant to separate of the flake type fillers, e.g., mica, from each other.

It is believed that the addition of glass microspheres allows the thermal stabilizing flake type fillers such as mica to flow, by becoming interposed between adjacent mica flakes to allow the individual flakes of mica to flow over one another. It is also believed that the hollow glass microspheres positioned between adjacent mica flakes allow the liquid resin to flow between the flakes and completely wet the mica. Typically, without the addition of hollow glass microspheres, the resin material separates from the fillers when pressed due to the resistance of the fillers to flow which leaves filler rich areas where the LVMC is displaced prior to pressing. Thus, in the most preferred form of the invention, an effective amount of hollow glass microspheres is necessary to achieve the desired wet-out of the polymer in the homogeneous composition.

In preparing the LVMC, the liquid components such as resin, low shrink additive, and catalyst are added to an auger type mixer. Fillers, mold release, thermal stabilizers and fiber reinforcements are then added followed by the hollow glass microspheres. After the LVMC is formed it may be immediately molded into door skins or may be stored essentially indefinitely as long as the LVMC is kept in an airtight container stored at or about room temperature.

The LVMC is used to form structures such as door skins, side lights and fan lights and transoms. A predetermined amount of LVMC molding compound is distributed about a tool mounted on a 300–500 ton press. The press is then activated and applies a force of up to about 500 PSI, preferably in a range of approximately 50–350 PSI and preferably about 210 PSI upon the structure. The tooling for forming a door skin preferably is formed of aluminum because of its light weight and low cost as compared to forged tool steel and includes mold halves which typically includes surfaces to form the raised panels 12a of the door, although the skins can be molded with a smooth outer surface if desired. One mold half may be formed with a simulated wood grain pattern in its surface to form in one (i.e., the outer) surface of the door skin 12 the wood grain appearance for subsequent staining. The upper and lower mold halves are heated to a temperature in the range of about 250–320° F. in order to cure the LVMC.

After the door skin is formed, it is removed from the press, any flashing is removed by hand with a file, the skin is allowed to cool to firmly set, and the door skins are stacked. The door skins of the present invention have no ribs or tabs on the back side of the door skin and the raised panels 12a are shaped on their reverse side 12b to mate with another door skin 12 when stacked. Because the door skins mate, it is possible to stack the skins at a rate of about 40 skins per foot rather than about 12 skins per foot with the prior art door skins. The stacked door skins are then prepared for final assembly.

In preparation for bonding with the door skins, the components of the frame 11 are coated with a weatherproof synthetic adhesive such as Imperial Adhesives 302 and allowed to dry. After the adhesive is dried, the door skin should be assembled before contamination by dust or dirt. The hinge-stile 18 and lock-stile 20 are mated with a lap jointed top rail 14 and a lap jointed bottom rail 16 and secured with staples 26 (See FIG. 1). An insulative core material 24, such an expanded polystyrene for example, is placed in the opening defined by the rails and stiles.

Lock-blocks 22 are then inserted and the top skin is placed over the assembly. The assembly is aligned and hot pressed at a temperature in the range of about 230° to 290°F. and at a pressure of about 300 psi to cure the adhesive and securely bond the components together. Upon exit from the hot press, the door skin assembly has a temperature of between 150 and 200° F. Once the door is removed from the hot press, it may be placed in a cold press to cool the assembly to approximately 100° F. The cool press process is used to speed the assembly line and is not essential for the manufacture of the door assembly. Excess adhesive is then removed, and the door assembly is trimmed about its periphery to square it and to conform its lengthwise and widthwise dimensions to standard door dimensions. The door skins are readily trimable with the wood frame to permit ready sizing of the door assembly to standard door dimensions.

The following Table sets forth examples of LVMC compositions found suitable for forming door skins for assembly into fiber reinforced plastic doors as described. Example No. 5 is the presently preferred composition.

|  | Example No. | | | | |
| --- | --- | --- | --- | --- | --- |
| (Ingredients by wt %) | 1 | 2 | 3 | 4 | 5 |
| Polyester Resin (Iso) | 0.0 | 0.0 | 24.0 | 24.0 | 29.0 |
| Polyester Resin (DCPD) | 26.0 | 24.0 | 0.0 | 0.0 | 0.0 |
| Low shrink Additive | 3.0 | 4.5 | 4.5 | 6.5 | 14.9 |
| Mica L125 | 0.0 | 0.0 | 0.0 | 14.3 | 11.5 |
| Mica L115 | 14.0 | 14.3 | 14.3 | 0.0 | 0.0 |
| Calcium Carbonate | 37.0 | 37.0 | 37.0 | 37.0 | 30.0 |
| Woolastonite | 10.0 | 10.0 | 10.0 | 8.0 | 0.0 |
| Carbon Fiber | 1.5 | 1.8 | 1.8 | 1.8 | 1.2 |
| Fiberglass | 5.0 | 4.5 | 4.5 | 4.5 | 8.0 |
| Zinc Stearate | 3.25 | 3.65 | 2.5 | 2.5 | 2.5 |
| TBPB (% liquid vol.) | .25 | .25 | .25 | .25 | .25 |
| Glass Bubbles | 0.0 | 0.0 | 1.15 | 1.15 | 2.65 |

Resin—Alpha Owens Corning polyester resin type 964-02,

DCPD Resin—Available from Alpha Owens Corning,

Low profile additive—Alpha Owens Corning type RP400,

TBPB—t-butyl perbenzoate manufactured by Elf-Atochem,

Mica—KMG Materials type L115 and L125,

Carbon Fibers—¼ inch, type 33 tow- 111 available from Zoltek,

Fiberglass—¼ inch chopped glass fibers type 405AA, available from Owens Corning, Zinc Stearate—Type S1200 manufactured by Mallinckrodt Chemical, Glass Microspheres—Type K-15 available from 3M Corporation, Woolastonite—Available from Intercorp, Inc.

Door skins were then pressed from these molding compositions by distributing 19.5 pounds of low viscosity molding compound about a tool mounted on a 300 ton press. The press was then activated and a force of approximately 210 pounds per square inch upon the door skin was applied at a temperature of about 290° F. for 1 ¾ minutes. The door skins were removed from the press and the flashing was removed.

The adhesion area of the door skins were cleaned of dust, dirt or loose fibers with an air spray nozzle. Imperial Adhesives 302 waterborne adhesive was then applied on the bond area of the door skins. The adhesive was force dried in an oven at between 150° F. for approximately five minutes. The adhesive was then tested to insure that no blistering or rolling occurred when rubbed with a finger. The prepared door skins were then cooled Rails and stiles were applied with adhesive and dried in the same manner. The rails and stiles were aligned on a door skin and stapled together and a lock-block was added to each rail.

An expanded polystyrene block 24 that had been molded to have surfaces conforming to the relief of the molded panels 12a in the skins 12 was then placed in the area defined by the rails and stiles. The top skin was then placed over the assembly. The assembly was aligned and hot pressed for one minute at about 300 psi. The door skin assembly was removed from the hot press at a temperature of 180° F. and cold pressed to cool the assembly to 100° F. The door assembly was removed from the cold press and excess adhesive was removed and the door assembly was prepared for shipping.

While the present invention has been illustrated by a description of various embodiments and while these embodiments have been described in considerable detail, it is not the intention of the Applicants to restrict or in any way limit the scope of the appended claims to such detail. Additional advantages and modifications will readily appear to those skilled in the art. The invention in its broader aspects is therefore not limited to the specific details, representative apparatus and method as shown and described. This has been a description of the present invention, along with the preferred method of practicing the present invention as currently known. However, the invention itself should only be defined by the appended claims, wherein

We claim:

1. A method of molding a thermoset polymer door skin comprising
    admixing a curable thermosetting polymer, a catalyst, a particulate filler and staple fibers to form a homogeneous composition having shelf stability,
    introducing said homogeneous composition into a mold defining a cavity for a door skin, and
    molding the homogeneous composition in the mold cavity pressure up to about 500 psi and a temperature up to about 320° F. to cure the thermosetting polymer and form the thermoset polymer door skin.

2. The method of claim 1 wherein said pressure is up to about 300 psi.

3. The method of claim 1 wherein said particulate filler is selected from the group consisting of inorganic salts, mica and glass hollow microspheres.

4. The method of claim 1 wherein said particulate filler is a mixture of mica and inorganic glass hollow microspheres.

5. The method of claim 4 wherein said hollow microspheres are glass beads and are contained in an amount to facilitate the wet-out of the polymer in the homogeneous composition.

6. The method of claim 1 wherein said mold is made of aluminum or aluminum alloy.

7. The method of claim 1 wherein the thermosetting polymer is selected from the group consisting of polyester, polyurethane, polyvinyl and epoxy polymers, and mixtures thereof.

8. The method of claim 6 wherein said mold has a wood grain thereon to impart the thermoset polymer door skin with said wood grain.

9. The method of claim 1 wherein said homogeneous composition comprises
    about 25 to about 80 wt % thermosetting curable polymer,
    about 5 to about 40 wt % calcium carbonate,
    about 5 to about 15 wt % mica,
    up to about 3 wt % glass hollow microspheres,
    about 0.5 to about 10 wt % staple fibers, and an effective amount of a catalyst and mold release agent.

10. The method of claim 9 wherein said staple fibers are selected from the group consisting of carbon fibers and glass fibers.

11. The method of molding a thermoset polymer door skin comprising
    admixing about 25 to about 80 wt % thermosetting curable polymer,
    about 5 to about 40 wt % calcium carbonate,
    about 5 to about 15 wt % mica,
    up to about 3 wt % hollow microspheres,
    about 0.5 to about 10 wt % staple fibers, and
    an effective amount of a catalyst and mold release agent to form a homogeneous composition,
    introducing said homogeneous composition into a mold defining a cavity for a door skin, and molding the homogeneous composition in the mold cavity at a pressure up to about 500 psi to cure the thermosetting polymer and form the thermoset polymer door skin.

12. The method of claim 11 wherein said thermosetting polymer is selected from the group consisting of polyester, polyurethane, polyvinyl and epoxy polymers, and mixtures thereof.

13. The method of claim 11 wherein said mold halves are made of aluminum with a wood grain on the surface of at least one of said mold halves to form a thermoset polymer door skin having a wood grain.

14. The method of claim 1 wherein said particulate filler is calcium carbonate.

15. The method of claim 1 wherein said staple fibers is selected from a group consisting of carbon fiber, fiberglass and mixtures thereof.

* * * * *

UNITED STATES PATENT AND TRADEMARK OFFICE
CERTIFICATE OF CORRECTION

PATENT NO : 6,024,908
DATED : February 15, 2000
INVENTOR(S) : Kenneth J. Koncelik It is certified that error appears in the above-identified patent and that said Letters Patent are hereby corrected as shown below:

The Title, lines 1 and 3 read "THERMOSTAT" and should read-THEMOSET-.

Claim 1, line 8 reads "in the mold cavity pressure up" and should read-in the mold cavity at a pressure up-.

Claim 11, line 7 reads "3 wt % hollow" and should read-3 wt% glass hollow-.

Signed and Sealed this

Seventeenth Day of April, 2001

NICHOLAS P. GODICI

*Attest:*

*Attesting Officer*   Acting Director of the United States Patent and Trademark Office